(12) United States Patent
Alon et al.

(10) Patent No.: US 6,411,573 B1
(45) Date of Patent: *Jun. 25, 2002

(54) MULTI-BEAM OPTICAL PICKUP

(75) Inventors: Amir Alon, Sunnyvale, CA (US); Tatiana Kosoburd, Lod (IL)

(73) Assignee: Zen Research (Ireland), Ltd., Dublin (IE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,313

(22) Filed: Feb. 20, 1998

(51) Int. Cl.[7] .................................................. G11B 7/00
(52) U.S. Cl. ............................ 369/44.23; 369/44.37; 369/112.05; 369/112.1
(58) Field of Search ...................... 369/44.37, 44.38, 369/44.41, 44.23, 112, 109, 103, 112.03, 112.05, 112.04, 112.07, 112.1, 124.02, 124.03, 44.12, 112.08, 112.13, 112.12

(56) References Cited

U.S. PATENT DOCUMENTS

| | | | |
|---|---|---|---|
| 3,843,231 A | 10/1974 | Borel et al. | 350/160 |
| 4,459,690 A | 7/1984 | Corsover et al. | 369/44 |
| 4,462,095 A | 7/1984 | Chen | 369/44 |
| 4,560,249 A | 12/1985 | Nishiwaki et al. | 350/162.17 |
| 4,633,455 A | 12/1986 | Hudson | 369/45 |
| 4,674,070 A | 6/1987 | Tajima et al. | 369/46 |
| 4,689,781 A | 8/1987 | Ando | 369/112 |
| 4,703,408 A | 10/1987 | Yonezawa et al. | 369/44 |
| 4,720,825 A | 1/1988 | Kokado | 369/46 |
| 4,730,899 A | 3/1988 | Kime et al. | 350/173 |
| 4,731,772 A | 3/1988 | Lee | 369/45 |
| 4,766,582 A | 8/1988 | Ando | 369/45 |
| 4,831,613 A | 5/1989 | Kanda | 369/109 |
| 4,845,552 A | 7/1989 | Jaggi et al. | 358/93 |
| 4,956,813 A | 9/1990 | Seya et al. | 365/127 |
| 4,982,395 A | 1/1991 | MacAnally | 369/44.37 |
| 5,049,732 A | 9/1991 | Nagahama et al. | 250/201.5 |
| 5,113,286 A | 5/1992 | Morrison | 359/569 |
| 5,128,914 A | 7/1992 | Kurata et al. | 369/44.37 |
| 5,130,965 A | 7/1992 | Karaki et al. | 369/44.38 |
| 5,132,953 A | 7/1992 | Matsubayashi | 369/44.37 |
| 5,140,577 A | 8/1992 | Ohsato | 369/44.37 |
| 5,144,616 A | 9/1992 | Yasukawa et al. | 369/122 |
| 5,153,863 A * | 10/1992 | Noda et al. | 369/44.37 |
| 5,161,139 A * | 11/1992 | Inoue et al. | 369/112 |
| 5,195,081 A | 3/1993 | Usui | 369/112 |

(List continued on next page.)

FOREIGN PATENT DOCUMENTS

| | | |
|---|---|---|
| EP | 0 400 899 A3 | 12/1990 |
| JP | 60-163236 | 8/1985 |
| WO | 90-13116 | 11/1990 |

OTHER PUBLICATIONS

Wai–Hon Lee, "High Efficiency Multiple Beam Gratings," Applied Optics, 18:2152–2158, Jul. 1979.

*Primary Examiner*—Thang V. Tran
(74) *Attorney, Agent, or Firm*—Fish & Neave; Nicola A. Pisano; Michael J. DeHaemer, Jr.

(57) ABSTRACT

An optical pickup for simultaneously reading a plurality of data tracks of an optical storage medium is provided. The optical pickup uses a diffractive element to split an illumination beam into a plurality of reading beams which are projected onto a plurality of tracks of the optical storage medium. Apparatus and methods are shown for improving the optical characteristics of the optical pickup by reducing vignetting, optical aberrations, and field curvature. These improvements are achieved by relocating the diffractive element at a greater distance from the laser source, so that a diffractive element having a larger period, and a smaller angle between diffractive orders may be used. The apparatus and methods shown also reduce the number of components and the manufacturing cost of the optical pickup.

20 Claims, 4 Drawing Sheets

U.S. PATENT DOCUMENTS

| | | |
|---|---|---|
| 5,212,572 A | 5/1993 | Krantz et al. .................. 359/15 |
| 5,239,529 A | 8/1993 | Tobita et al. .................. 369/48 |
| 5,285,062 A | 2/1994 | Lee ............................ 250/216 |
| 5,414,683 A | 5/1995 | Tani |
| 5,418,774 A | 5/1995 | O'Hara et al. ............ 369/275.3 |
| 5,428,595 A | 6/1995 | Yoshida et al. .............. 369/109 |
| 5,440,427 A | 8/1995 | Miyake et al. ............... 359/566 |
| 5,495,461 A | 2/1996 | Komma et al. .............. 369/103 |
| 5,511,051 A | 4/1996 | Rokutan et al. ......... 369/44.28 |
| 5,574,597 A | 11/1996 | Kataoka ..................... 359/569 |
| 5,583,836 A | 12/1996 | Rokutan et al. ......... 369/44.28 |
| 5,652,744 A | 7/1997 | Freeman et al. ............. 369/109 |
| 5,663,940 A | 9/1997 | Horimai et al. .......... 369/44.23 |
| 5,717,667 A | 2/1998 | Horimai et al. .......... 369/44.23 |

\* cited by examiner

MULTI-BEAM OPTICAL PICKUP

FIELD OF THE INVENTION

This invention relates to apparatus for simultaneously reading multiple tracks of an optical storage medium. More particularly, the invention relates to providing an optical pickup that produces multiple reading beams from a single source, and which has optical characteristics superior to those of previous similar systems.

BACKGROUND OF THE INVENTION

Due to their high storage density, long data retention life, and relatively low cost, optical disks have become popular as a means to distribute information. Large format disks have been developed for storing full length motion pictures. The compact disk (CD), and more recent mini disk (MD) formats were developed and marketed for the distribution of musical recordings and have essentially replaced vinyl records. High-capacity, read-only data storage media, such as CD-ROM, have become prevalent in the personal computer field, while the new Digital Versatile Disk (DVD) format may soon replace videotape as the distribution medium for video information.

An optical disk is made of a transparent disk or substrate in which data, in the form of a serial bit-stream, is encoded as a series of pits in a reflective surface within the disk. Data is read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical systems detect the modulated, reflected, laser light and produce an electrical signal which may be decoded to recover the digital data stored on the optical disk. The recovered digital data, which may include error correcting codes and additional subcoded information, is further processed to recover the stored data.

To be able to retrieve data from anywhere on an optical disk, an optical system includes a pickup assembly which may be positioned to read data from any disk track. An example of an integrated optical pickup assembly, wherein the laser source of illumination, focusing optics, and the detector that receives reflected illumination from the optical disk are contained within a single compact pickup assembly is described in U.S. Pat. No. 5,285,062. Servo mechanisms are provided for focusing the optical system and for keeping the pickup assembly positioned over the track, despite disk warpage or eccentricity.

In most previously known systems the data is retrieved from the disk serially, i.e. one bit at a time, so that the maximum data transfer rate for the optical disk reader is determined by the rate at which the pits pass by the pickup assembly. The linear density of the bits and the track pitch are fixed by the specification of the particular optical disk format. For example, CD disks employ a track pitch of 1.6 $\mu$m, while the DVD employs a track pitch only about one-half as wide.

Commercialized methods of increasing the data transfer rate of optical disk readers have focused on increasing the rate at which the pits pass by the pickup assembly by increasing the rotational speed of the disk itself. Currently, drives with rotational speeds of 2× to 12×standard speed are commercially available. However, higher disk rotational speeds place increased demands on the optical and mechanical subsystems within the optical disk player, making such players more difficult and expensive to design and manufacture.

Another previously known technique for increasing the average data transfer rate involves simultaneously reading multiple tracks of data. For example, U.S. Pat. No. 5,144,616 to Yasukawa et al. describes a system for generating multiple reading beams using multiple laser sources which are spaced apart by predetermined distances. U.S. Pat. No. 4,459,690 to Corsover et al. describes a multi-beam reading system in which an illumination beam generated by a single laser source is split into multiple beams using an acousto-optic device that dithers the beam in a direction normal to the track direction.

A drawback common to the foregoing multi-beam systems is that the generation of multiple beams requires either multiple laser sources or the use of complicated acousto-optic devices. In either event, both the manufacturing complexity and overall size of the pickup system increases, leading to difficulties in aligning the optics and the detectors, increased power requirements, and increased overall cost.

Copending U.S. patent application Ser. No. 08/804,105 describes tracking and data processing circuitry for a system to increase disk reading speeds by using multiple beams which are generated using a diffractive element to read multiple tracks simultaneously. In the system described, as well as other multi-beam systems which use diffractive elements to split a single beam into multiple beams, the diffractive element is typically placed in the optical path immediately after the laser diode. The small distance between the laser and the diffractive element requires use of a diffractive element having a relatively small period.

The small period of the gratings used in such multi-beam systems makes the gratings difficult and expensive to manufacture. Off-axis aberrations also increase the field curvature of the optical system, so that the best focus locations of the outermost beams are different than the best focus location for the central beam. Thus, when the central beam is in focus, the outermost beams may be out of focus.

In view of the foregoing, it would be desirable to provide a multi-beam optical pickup for simultaneously reading multiple tracks of an optical storage medium that uses a diffractive element to generate the beams, and that has improved optical characteristics, such as reduced vignetting and reduced aberration of the outermost beams.

It also would be desirable to provide a multi-beam pickup having fewer optical components, and components which are easier to manufacture, reducing the cost of producing the optical pickup.

SUMMARY OF THE INVENTION

In view of the foregoing, it is an object of the present invention to provide a multi-beam optical pickup for simultaneously reading multiple tracks of an optical storage medium that uses a diffractive element to generate multiple beams, and that has improved optical characteristics compared to previously known systems.

It is a further object of the invention to provide a multi-beam pickup assembly that contains fewer parts than previously known systems, and is easy to manufacture, thereby reducing the cost of the system.

These and other objectives of the invention are accomplished by providing a multi-beam optical pickup wherein the diffractive element, used to generate the beams, is placed after a collimator in the optical path. This arrangement provides a greater distance from the laser source to the diffractive element than is found in previously known systems. This greater distance permits a diffractive element having a relatively large period and a small angle between diffractive orders to be used, thereby reducing vignetting and optical aberrations in the outermost beams. The new placement of the grating, after the collimating lens, reduces the off-axis aberrations of the outer beams. Reduction of off-axis aberrations also decreases the field curvature of the optics, and enables more beams to be used in the multi-beam system.

The larger period of the diffractive element also makes the diffractive element easier and less costly to manufacture. By combining diffractive and holographic elements used in the optical pickup with other optical elements, the number of parts in the optical pickup may be reduced, further reducing the complexity and cost of manufacturing.

Further features of the invention, its nature and various advantages will be more apparent from the accompanying drawings and the following detailed description of the preferred embodiments.

DETAILED DESCRIPTION OF THE INVENTION

This description first describes a previously known optical pickup for generating multiple illumination beams from a single light source as background of the present invention. The improvement of such a system in accordance with the present invention is then described and alternative embodiments are disclosed.

Figure 1:
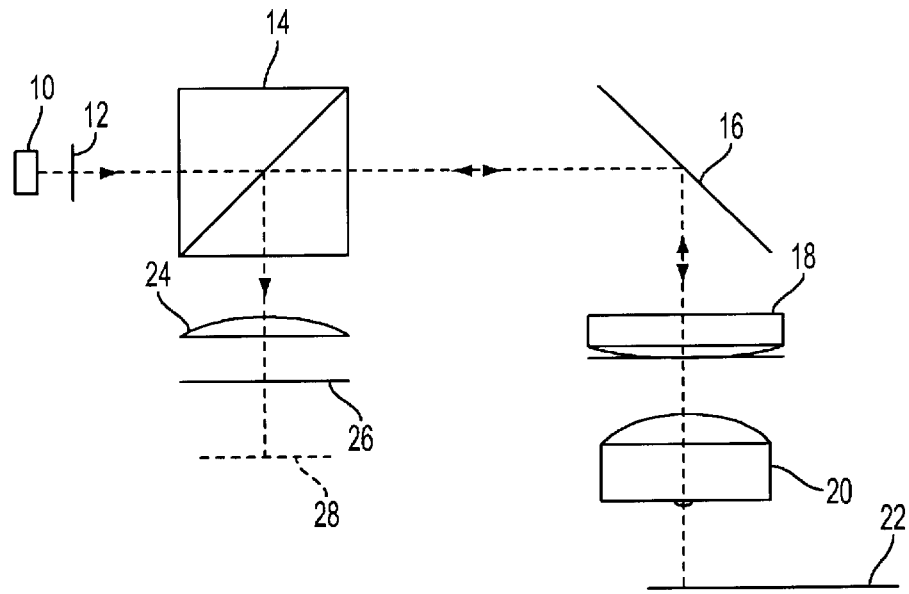
FIG. 1 is a block diagram of a previously known multi-beam optical pickup.

FIG. 1 shows a previously known multi-beam optical pickup which uses a diffractive element to generate multiple reading beams. Laser diode 10 generates an illumination beam, which is split into a plurality of reading beams when it passes through diffractive element 12. The reading beams then pass through beamsplitter 14, and are reflected by mirror 16 toward collimator 18 and objective 20, which focusses the beams onto a surface of optical disk 22. The plurality of reading beams are reflected from the data-bearing surface of optical disk 22, modulated by the data recorded on a plurality of tracks of optical disk 22. The reflected, modulated beams again pass through objective 20 and collimator 18, and are directed back to beamsplitter 14 by mirror 16. Beamsplitter 14 directs the beams through detector lens 24 and holographic element 26 onto detector array 28. Detector array 28 comprises a plurality of photodetector elements, which are used to detect the modulation of the reading beams to read the data from the tracks of the optical disk, and may be used to detect errors in the focus and tracking of the optical disk reader.

Hereinafter, the part of the optical path from laser diode 10 to the surface of optical disk 22, as described above, will be referred to as the "illumination" optical path. The part of the optical path from the surface of optical disk 22 to detector array 28 will be referred to as the "imaging" optical path.

Figure 2A:
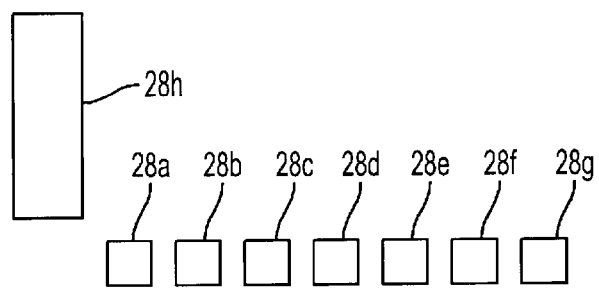
FIGS. 2A and 2B are image and focus detection systems for use with the multi-beam optical pickup of FIG. 1.
Figure 2B:
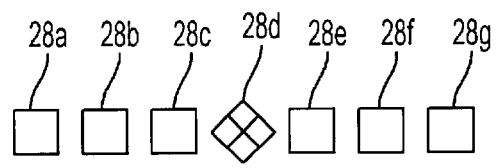

Detector array 28 is shown in greater detail in FIGS. 2A and 2B. FIG. 2A shows a detector array for use with a multi-beam optical pickup having seven reading beams, which can read seven tracks of an optical disk simultaneously. Holographic element 26 splits the reading beams to send part of the light from the beams to photodetector elements 28a–28g, and part of the light to focus and tracking detector 28h, which may comprise any of a number of known focus detector designs. Each of the seven reading beams is projected onto one of the photodetector elements, each of which produces a signal corresponding to the data stored in one of the data tracks of the optical disk.

Alternatively, holographic element 26 may introduce astigmatism into the reading beams, and direct them onto a detector array as shown in FIG. 2B, in which central photodetector element 28d comprises a quadrant detector, for use with the well-known astigmatism method of focus detection.

Further details on the workings of a multi-beam optical pickup may be found in commonly assigned co-pending U.S. patent applications Ser. Nos. 08/804,105 and 08/911, 815, both of which are incorporated herein by reference. Details on known focussing and tracking systems for use with optical disk readers may be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2nd ed., A–R Editions, 1992. It will be evident to one skilled in the relevant arts that the arrangement and number of detector elements, and the number of reading beams described here are illustrative, and may be changed.

In multi-beam optical pickups like the one shown in FIG. 1, the small distance between laser diode 10 and diffractive element 12 necessitates that diffractive element 12 have a small period. The small period of diffractive element 12 in turn requires that the angle between diffractive orders, or reading beams, be relatively large, and causes problems on the collimating lens such as vignetting and optical aberration. Using a beam with a wavelength of 650 nm, a typical optical pickup of the type shown in FIG. 1 might have, for example, a diffractive element with a period of 15.9 microns, and an angle between diffractive orders of 2.34 degrees. This angle between diffractive orders means that in a seven beam system (having three beams on each side of the central beam) the angle between the central beam and the outermost beams will be approximately 7 degrees.

Figure 3:
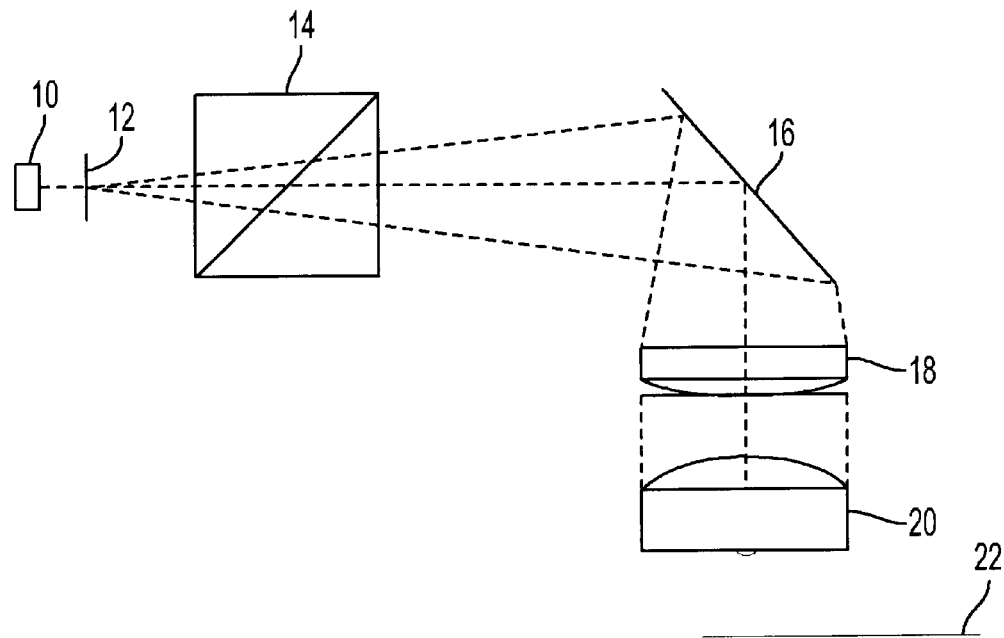
FIG. 3 depicts a ray trace of the illumination part of the optical path for the center beam, and the outermost beams in the previously known optical pickup of FIG. 1.

Referring to FIG. 3, the illumination optical path of the optical pickup of FIG. 1 is described, with a ray tracing (not to scale) of the center beam and the outermost beams. As illustrated in the figure, the wide angle between the beams causes the outermost beams to strike mirror 16 near its edges, thus losing some of the energy of the beams beyond the edges of the mirror. This loss of energy at the edges of optical elements is called vignetting, and also occurs where the outermost beams strike the edges of collimator 18 and objective 20. In a system such as depicted in FIGS. 1 and 3, a large part of the energy of the outer beams may be lost to vignetting.

Beams which pass through the extreme edges of lenses and other optical elements also suffer optical aberrations. In FIG. 3, the outer beams of the multi-beam optical pickup pass through the edges of collimator 18 and objective 20, causing optical aberrations in the beams which are projected onto the disk.

The off-axis aberration of the optical elements in the pickup also causes an increase in the field curvature of the optical system, which in turn has an effect on the focus of the system. Specifically, due to the increased field curvature, when the inner beams are in focus, the outer beams may be out of focus.

Figure 4:
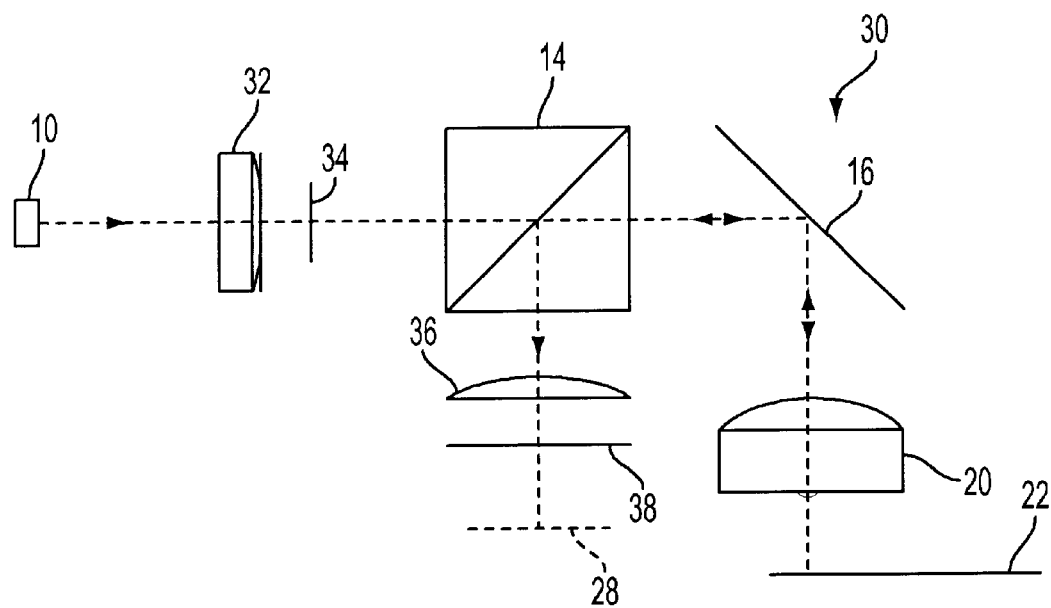
FIG. 4 is a block diagram of a multi-beam optical pickup constructed in accordance with the principles of the present invention.

Many of the foregoing problems of previously known multi-beam optical pickups can be solved using an optical pickup built in accordance with the principles of the present invention. Referring now to FIG. 4, in optical pickup 30, collimator 32 and diffractive element 34 have been moved relative to the positions of collimator 18 and diffractive element 12 of FIG. 1. Collimator 32 has been moved in front of diffractive element 34 in the illumination optical path, while diffractive element 34 has been moved a greater distance from laser diode 10. Because beams reflected off of optical disk 22 do not pass through collimator 32, detector lens 36 and holographic element 38 must be designed to properly align the reflected reading beams with the detector elements.

In addition to decreasing the vignetting and optical aberrations, the field curvature is reduced due to the parallelism of the beams when they strike diffractive element 34. The reduction in vignetting causes more energy to reach detector array 28, and the reduction in optical aberration and field curvature enable a better image to be projected onto the detector array.

In addition to improving the optical characteristics of the system, arrangement of collimator 32 and diffractive element 34 in accordance with the present invention may reduce the cost of manufacturing the system. For example, the larger period of diffractive element 34 may make diffractive element 34 easier and less costly to produce.

Figure 5A:
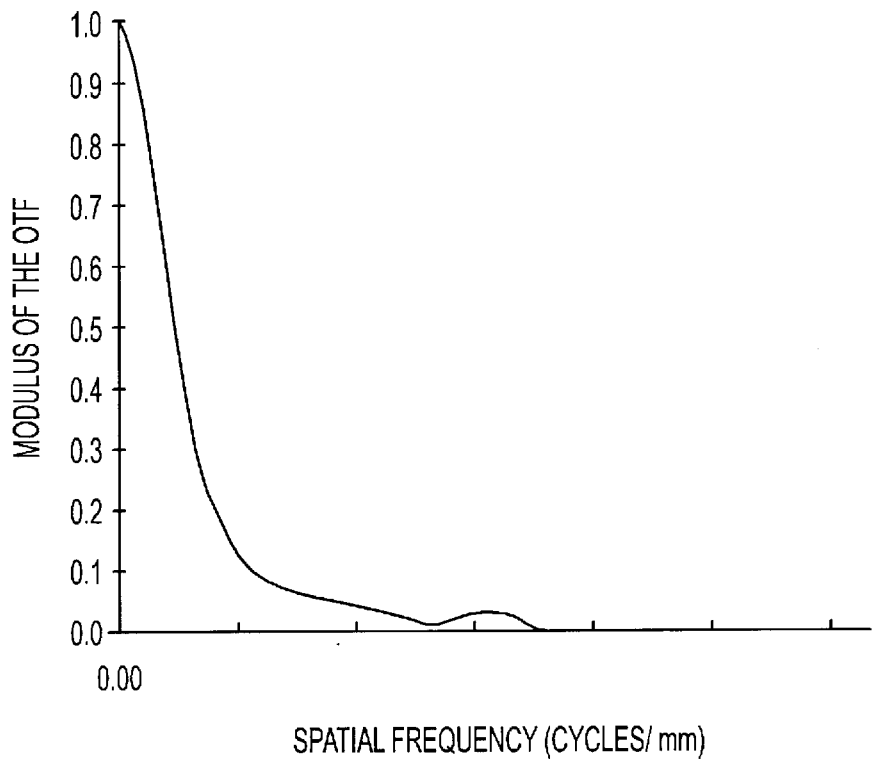
FIGS. 5A and 5B are plots of the modulation transfer function of the outermost beams of the optical pickups of FIG. 1 and FIG. 4, respectively.
Figure 5B:
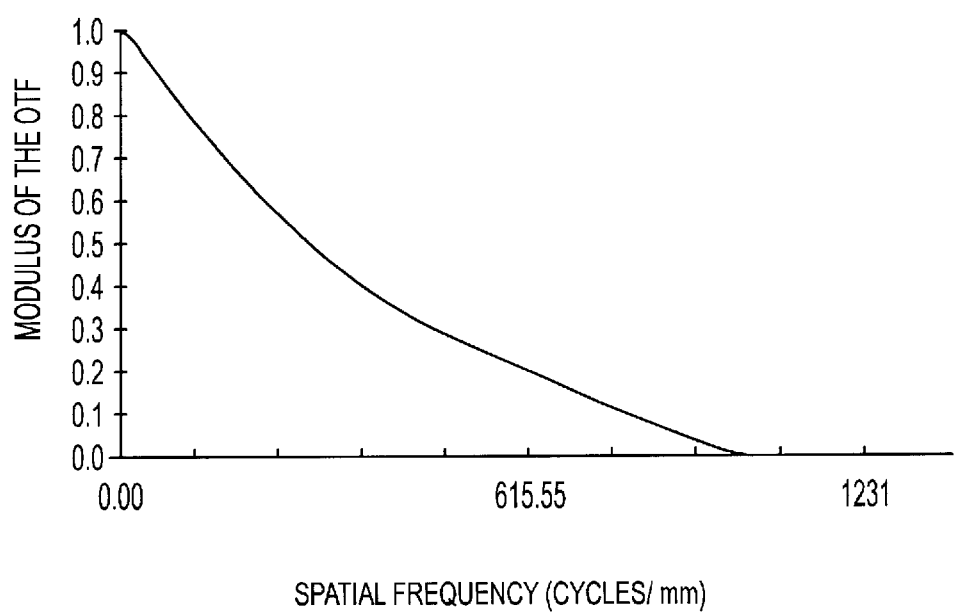

The improvement of the optical system is measured using the modulation transfer function (MTF), which is a common metric used to measure the performance of optical systems. A method for measuring the MTF of an optical system is described in U.S. Pat. No. 5,629,766, to Kaplan, incorporated herein by reference. The MTF of an optical system can be shown as a plot of the modulus of the optical transfer function against the spatial frequency of a target being imaged by the system (typically measured in cycles per millimeter). As shown in FIG. 5A, the MTF of the third diffractive order (i.e. the farthest beam from the center beam) for the previously known multi-beam system shown in FIG. 1 drops rapidly as the spatial frequency increases. FIG 5B shows the MTF of the fifth diffractive order in the new system. As can be seen, the MTF for the improved optical system of FIG. 4 decreases much less rapidly than the MTF for the old system of FIG. 1, indicating improved optical performance.

Figure 6:
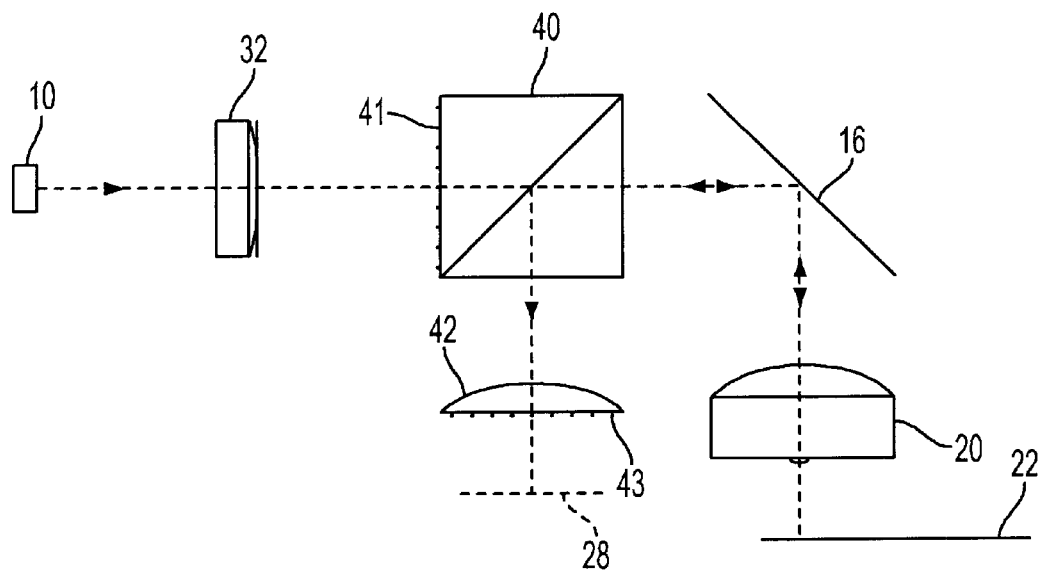
FIG. 6 is a block diagram of an alternative embodiment of a multi-beam optical pickup constructed in accordance with the principles of the present invention.

Referring now to FIG. 6, further cost savings may be achieved by replacing diffractive element 34 and beamsplitter 14 with combined element 40, and replacing holographic element 38 and detector lens 36 with combined element 42. Beamsplitter 40 has a diffractive element embossed on surface 41, nearest to collimator 32, so that a beam along the illumination path which strikes beamsplitter 40 first passes through the diffractive element on the surface of beamsplitter 40. The diffractive element embossed on surface 41 splits the illumination beam produced by laser diode 10 into a plurality of reading beams.

Similarly, a holographic element may be embossed on surface 43 of detector lens 42, nearest to the detectors, so that after passing through detector lens 42, beams pass through the holographic element. The holographic element embossed on surface 43 serves the same purpose as holographic element 26 of FIG. 1. Depending on the type of focus system used, the holographic element either splits the beams, and directs some of their energy to a separate focus detector, or acts as an astigmatic element to permit astigmatism focus detection methods to be used.

Combining the diffractive and holographic elements with the beamsplitter and detector lens, as shown in FIG. 5, reduces the number of components in the optical pickup, thereby making the pickup easier and less costly to manufacture.

Figure 7:
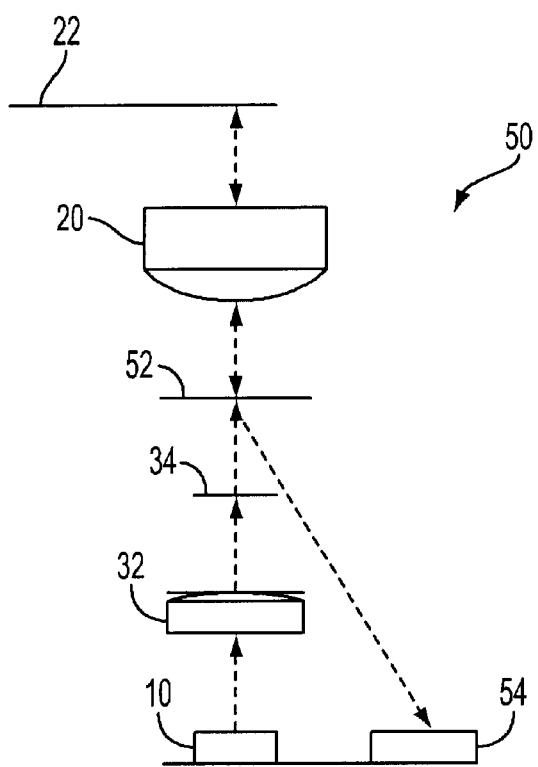
FIG. 7 is a block diagram of a further alternative embodiment of a multibeam optical pickup constructed in accordance with the present invention.

Another optical pickup constructed in accordance with the principles of the present invention is shown in FIG. 7. In optical pickup 50, the component count is reduced by removing the beamsplitter, and using holographic element 52 to split and direct beams reflected from optical disk 22 towards detector array 54. Holographic element 52 also directs beams reflected from disk 22 onto the focus detector and introduces astigmatism into the beams, so that the astigmatism focus method may be used. The reduced component count makes optical pickup 50 inexpensive to manufacture. Optical pickup 50 can also be arranged as a compact optical pickup assembly, as described in commonly assigned, co-pending U.S. patent application Ser. No. 08/911,815, which is incorporated herein by reference.

It will be apparent to one skilled in the relevant arts that the optical pickup described above could be easily altered to use more, or fewer reading beams.

While preferred illustrative embodiments of the present invention are described, it will be apparent to one skilled in the art that various changes and modifications may be made therein without departing from the invention. It is intended in the appended claims to cover all such changes and modifications which fall within the true spirit and scope of the invention.

What is claimed is:

1. An optical pickup for simultaneously reading multiple data tracks of an optical disk, the optical pickup comprising:
   a laser source emitting an illumination beam along a path;
   a diffractive element disposed in the path of the illumination beam, the diffractive element splitting the illumination beam into a plurality of reading beams, wherein the angle between adjacent beams is less than 2.34 degrees;
   a collimator interposed between the laser source and the diffractive element and in the path of the illumination beam;
   an objective lens that focuses each of the plurality of reading beams onto a corresponding data track on a surface of the optical disk;
   a plurality of photodetector elements, each one of the plurality of photodetector elements generating a signal corresponding to the data stored in a respective data track; and
   means for directing each reading beam reflected from the surface of the optical disk to a corresponding one of the plurality of photodetector elements.

2. The optical pickup of claim 1, further comprising:
   a focus detector;

a detector lens interposed between the means for directing and the plurality of photodetector elements; and a holographic element interposed between the detector lens and the plurality of photodetector elements, the holographic element directing a first portion of the reading beams reflected from the surface of the optical disk onto the focus detector, and a second portion of the reading beams reflected from the surface of the optical disk onto the plurality of photodetector elements.

3. The optical pickup of claim 1, wherein one of the plurality of photodetector elements comprises a quadrant focus detector, and the optical pickup further comprises:

a detector lens interposed between the beamsplitter and the plurality of photodetector elements; and an astigmatic element for introducing astigmatism into the reading beams reflected from the surface of the optical disk, the astigmatic element interposed between the detector lens and the plurality of photodetector elements.

4. The optical pickup of claim 1 wherein the means for directing comprises a holographic element.

5. The optical pickup of claim 1 wherein the means for directing comprises a holographic element and beamsplitter in series.

6. The optical pickup of claim 1, wherein the means for directing comprises a beamsplitter, and wherein the diffractive element and the beamsplitter are combined into one optical component.

7. The optical pickup of claim 6, wherein the diffractive element is embossed onto a surface of the beamsplitter so that the illumination beam passes through the diffractive element before passing through the beamsplitter.

8. The optical pickup of claim 2, wherein the detector lens and the holographic element are combined into one optical component.

9. The optical pickup of claim 8, wherein the holographic element is embossed onto a surface of the detector lens so that reading beams reflected from the surface of the optical disk pass through the detector lens before passing through the holographic element.

10. The optical pickup of claim 3, wherein the astigmatic element is embossed onto a surface of the detector lens so that reading beams reflected from the surface of the optical disk pass through the detector lens before passing through the astigmatic element.

11. The optical pickup of claim 1, wherein the diffractive element is a diffraction grating having an angle between diffractive orders less than 2.34 degrees.

12. The optical pickup of claim 1, wherein the diffractive element is a diffraction grating having a period greater than 15.9 microns.

13. The optical pickup of claim 1, wherein the diffractive element splits the illumination beam into seven reading beams.

14. The optical pickup of claim 13, wherein the plurality of photodetector elements comprises a central photodetector element, and three photodetector elements disposed collinearly on opposite sides of the central photodetector element.

15. A method for reducing vignetting, optical aberration, and field curvature in an optical pickup of a multi-beam optical disk reader, the method comprising steps of:

providing an optical pickup having a laser diode that generates an illumination beam having a path, a diffractive element for splitting the illumination beam into a plurality of reading beams wherein an angle between adjacent beams less than 2.34 degrees, an objective lens for focusing the plurality of reading beams onto a surface of an optical disk, a plurality of detector elements, and means for directing reading beams reflected from the surface of the optical disk onto the plurality of detector elements;

directing each reading beam in the plurality of reading beams onto a corresponding data track on the surface of the optical disk;

directing each beam reflected from the surface of the optical disk onto a corresponding detector element in the plurality of detector elements; and positioning a collimator between the laser diode and the diffractive element in the path of the illumination beam.

16. The method of claim 15, wherein the means for directing is a beamsplitter, the method further comprising a step of embossing the diffractive element onto a surface of the beamsplitter so that the illumination beam passes through the beamsplitter before passing through the diffractive element.

17. The method of claim 15, further comprising steps of:

providing a focus detector;

providing a detector lens; and providing a holographic element interposed between the detector lens and the plurality of detector elements, the holographic element directing and focussing a first portion of the reading beams reflected from the surface of the optical disk onto the focus detector, and a second portion of the reading beams reflected from the surface of the optical disk onto the plurality of detector elements.

18. The method of claim 17, further comprising steps of embossing the holographic element onto a surface of the detector lens so that the reading beams reflected from the surface of the optical disk pass through the detector lens before passing through the holographic element.

19. The method of claim 15, further comprising steps of:

providing a detector lens; and providing an astigmatic element; and providing a plurality of detector elements wherein a central element of the plurality of detector elements is quadrant focus detector.

20. The method of claim 19, further comprising a step of embossing the astigmatic element onto a surface of the detector lens so that reading beams reflected from the surface of the optical disk pass through the detector lens before passing through the astigmatic element.

* * * * *